US006963562B1

(12) United States Patent
McRobert

(10) Patent No.: US 6,963,562 B1
(45) Date of Patent: Nov. 8, 2005

(54) MATCH SIGNALS IN DATA SWITCHING SYSTEMS INCLUDING MULTIPLE SWITCHING DEVICES

(75) Inventor: Stephen McRobert, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 800 days.

(21) Appl. No.: 09/593,815

(22) Filed: Jun. 15, 2000

Related U.S. Application Data

(60) Provisional application No. 60/152,949, filed on Sep. 9, 1999.

(51) Int. Cl.[7] ............................................. H04L 12/50
(52) U.S. Cl. ...................... 370/362; 370/389; 370/522; 370/465
(58) Field of Search ................................ 370/465, 489, 370/496, 522, 910, 911, 360, 362, 363, 389, 370/466, 401

(56) References Cited

U.S. PATENT DOCUMENTS 6,128,294 A * 10/2000 Oura et al. ................. 370/389
6,243,394 B1 * 6/2001 Deng ......................... 370/466
6,459,700 B1 * 10/2002 Hoang ........................ 370/401
6,643,286 B1 * 11/2003 Kapadia et al. ............. 370/389

* cited by examiner

Primary Examiner—Phirin Sam
Assistant Examiner—Robert W. Wilson

(57) ABSTRACT

A novel method of data packet switching in a data packet switching system having multiple switching devices. The method includes comparing destination address information of a received data packet with current address information maintained in an address table of one of the switching devices, and supplying a match signal to other switching devices when the destination address information matches the current address information. As a result, all other switching devices in the system are informed that the host with the destination address that caused the match signal is not connected to one of their own media ports. The match signal sent to other switching devices in the system is unambiguously associated with the destination address that caused the match. Also, the match signal may uniquely identify the switching device that generates this signal. In response to the match signal, the current address information of the other switching devices in the system may be updated in accordance with the destination address information that caused the match signal to forward traffic with that destination address to the appropriate switching device.

15 Claims, 3 Drawing Sheets

US 6,963,562 B1

MATCH SIGNALS IN DATA SWITCHING SYSTEMS INCLUDING MULTIPLE SWITCHING DEVICES

RELATED APPLICATIONS

This application claims priority from U.S. Provisional Patent Application No. 60/152,949, filed Sep. 9, 1999, which is incorporated herein by reference.

FIELD OF THE INVENTION

The present invention relates to data communications, and more particularly, to producing matching signals for interconnecting address tables of multiple switching devices in a packet switching system.

BACKGROUND ART

A switch including multiple switching devices may be provided in a data communication network to enable data communication between multiple network stations connected to various ports of the switch. A logical connection may be created between receive ports and transmit ports of the switching devices to forward received frames to appropriate destinations. Based on frame headers including source and destination address information, a frame forwarding arrangement makes a frame forwarding decision about which, if any, ports the frames will be forwarded to.

To support frame forwarding operations, each switching device maintains an address table containing source and destination address information. Whenever, a switching device receives a frame, it reads the source address of the frame, and if this address is not found in the table, an address entry corresponding to the port from whence the frame came may be added to the table. The switching device also reads the destination address of the frame, and if this address can be matched to a particular port, the device will forward the frame to that port.

In a switching system using multiple switching devices, the destination address of a frame may be not found in the address table of a particular switching device that receives the frame. In this case, the device will "flood" the frame to all of its ports and to an expansion bus connecting various switching devices of the switching system. However, frame flooding is undesirable because it uses up the bandwidth of the system.

Therefore, it would be desirable to create a mechanism that enables a switching system to share address table information among switching devices.

DISCLOSURE OF THE INVENTION

The invention offers a novel method of data packet switching in a data packet switching system having multiple switching devices. The method includes comparing destination address information of a received data packet with current address information maintained by one or more of the switching devices, and supplying a match signal to other switching devices when the destination address information matches the current address information. For example, the current address information may be stored in an address table of the switching device. The address table of the switching device may be preset to specific values by the intervention of someone such as a system administrator. During normal operation, the values in the address table will be updated via several different mechanisms. The value of an address table prior to an update is referred in this application as its current value.

The switching devices that received the match signal are informed that the host with the destination address that caused the match signal is not connected to one of their own media ports. The match signal sent to other switching devices in the system is unambiguously associated with the destination address that caused the match. Further, the match signal may uniquely identify the switching device that generates this signal. In response to the match signal, the current address information of the other switching devices in the system may be updated in accordance with the destination address information that caused the match signal, to enable the switching system to forward traffic with that destination address to the appropriate switching device.

The device that generates the match signals and forwards the associated frame to the other devices in the switching system should do so only on the first occasion on which it detects an exact address match. On all subsequent occasions it should neither forward the frame nor assert the match signals, because forwarding the frame wastes bandwidth on the expansion bus connecting the switching devices together.

Each device in the switching system will update its address tables on this first occasion, and will not need to be reminded.

The novel method of data switching in accordance with the present invention may be implemented in a data communication system comprising multiple switching devices for switching data packets, and an expansion bus for transferring the data packets between the switching devices. Each switching device has an address processing block for comparing destination address information of a received data packet with current address information, and producing a match signal supplied to another switching device when the destination address information matches the current information.

The address processing block may be configured for producing a forwarding control signal for forwarding the received data packet to a destination associated with the destination address information. Also, the address processing block may be configured for comparing source address information of a received data packet with the current address information to update the current address information in accordance with the source address information if the source address information does not match the current address information.

Each switching device may comprise a match pin connected to the match pin of another switching device to transfer the match signal. Alternatively, the match signal may be transferred via the expansion bus as a prefix or suffix to the data packet that caused the match signal. The match signal may indicate that a match occurred and may identify switching device generated the match signal.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
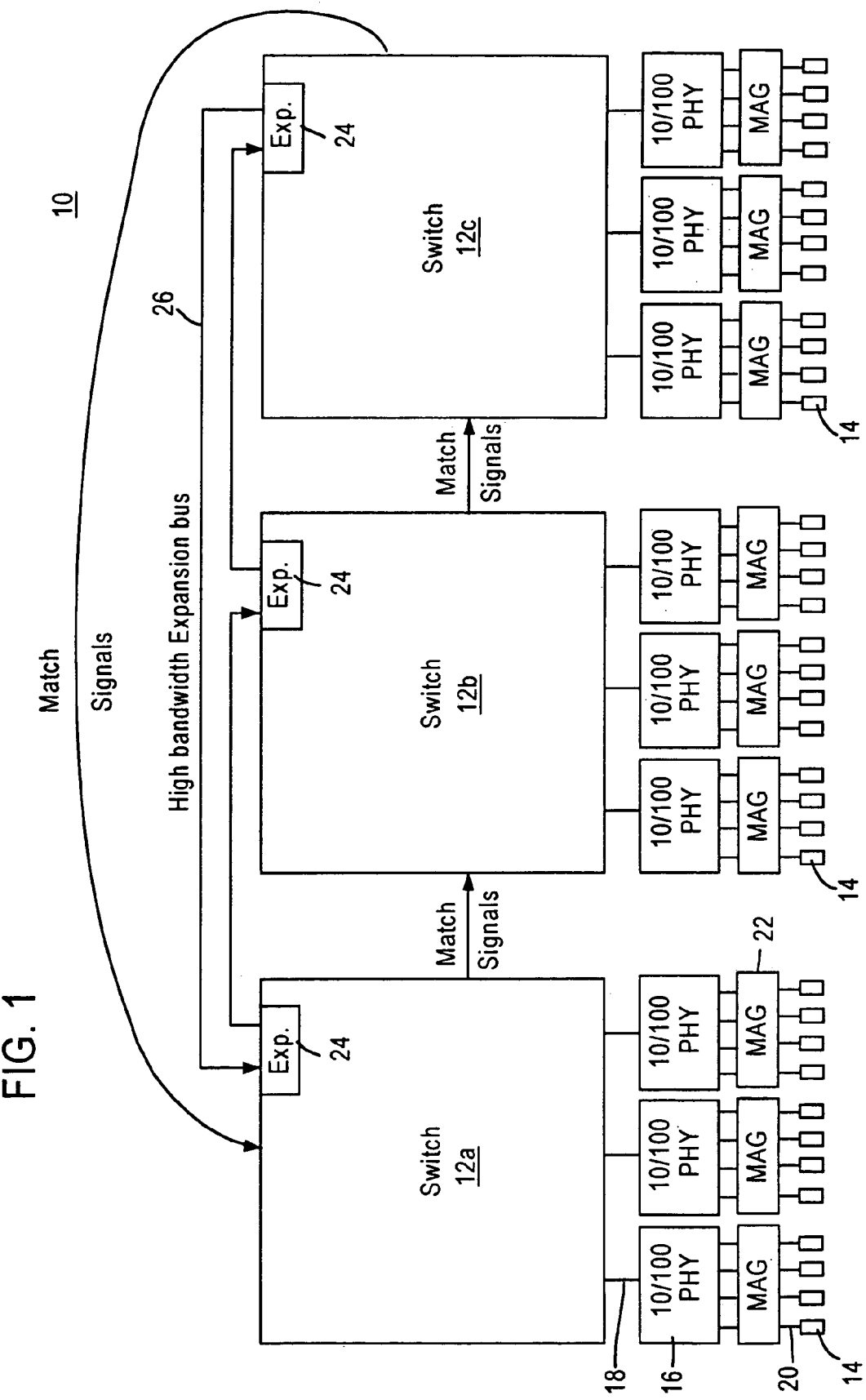
FIG. 1 is a block diagram of a packet switched network including a switch having multiple switching devices according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network comprises a switch unit including multiple switching devices 12 that enable communication of data packets between network stations. Although FIG. 1 shows that the switch unit includes three switching devices 12a, 12b and 12c, the present invention is applicable to switching systems including any number of switching devices 12.

The network 10 may include network stations having different configurations, for example 10 megabit per second (Mb/s) or 100 Mb/s network stations 14 (hereinafter 10/100 Mb/s) that send and receive data at a network data rate of 10 Mb/s or 100 Mb/s. Each switching device 12 includes multiple media access control (MAC) ports that transmit and receive data frames to and from 10/100 Mb/s physical layer (PHY) transceivers 16 via respective media independent interfaces (MII) 18 according to IEEE 802.3u protocol.

Each 10/100 Mb/s network station 14 sends and receives data frames to and from the corresponding switching device 12 via a media 20 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality.

The 10/100 Mb/s network stations 14 that operate in full duplex mode send and receive data frames according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switching device 12 is coupled to 10/100 Mb/s physical layer (PHY) transceivers 16 configured for sending and receiving data frames to and from the corresponding switching device 12 across a corresponding media independent interface (MII) 18. A magnetic transformer 22 provides AC coupling between the PHY transceiver 16 and the corresponding network medium 20.

Each switching device 12 may also include an expansion port 24 for transferring data to and from other switching devices via an expansion bus 26 according to a prescribed protocol. For example, the expansion bus 26 may be implemented as a "daisy chain" high bandwidth expansion bus. The expansion port 24 may be implemented as a gigabit MAC port for sending and transmitting data frames via the high-bandwidth expansion bus 26 at a network speed of 1 Gb/s.

As discussed in more detail later, each switching device 12 contains an address table for storing address information of network stations. Whenever a switching device 12 receives a frame, it compares the source address (SA) information of the frame with the address information in the address table. If the SA information does not match any address entry in the address table, the switching device 12 creates a new entry corresponding to the SA information.

Also, the switching device 12 compares the destination address (DA) information of each received frame with the address information in the address table. If the switching device 12 determines that the DA information matches the address information stored in the address table for a particular port, the switching device 12 forwards the frame to that port (the expansion bus is considered to be a port).

In addition, when the switching device 12 determines that the DA information of a received frame matches the address information stored in its address table, it asserts a match signal associated with the corresponding DA information. The match signal is supplied to other switching devices 12 in the switching unit to notify them that the corresponding DA address information is associated with the switching device 12 that originates the match signal. Thus, the other switching devices 12 in the switching unit are informed that the host with the respective DA address information is not connected to one of their own media ports. The switching device 12 only asserts the match signal on the first occasion on which it recognizes a match for the destination address of an incoming packet.

Immediately on assertion of the match signal, the switching devices 12 receiving this signal cease to flood the frame with the corresponding DA information. Also, the switching devices 12 use the received match signal to update address information in their address table. When the switching devices 12 find the respective DA information next time, they forward the corresponding frame only to the expansion bus 26 to transfer to the switching device 12 connected to the host with the respective DA information.

A switching device 12 that generates the match signal may be provided with a unique number. This would make it possible for the switching system as a whole to forward traffic with the DA information associated with the match signal directly to the switching device 12 connected to the host with the respective DA. This could improve the efficiency of the whole switching system by allowing frames to be sent directly to this switching device, instead of having each switching device 12 send frames that do not have matching DA information to all of the other switching devices 12. Thus, the match signal sent by every switching device 12 to all other switching devices 12 in the system is unambiguously associated with the DA that causes the match signal and with the switching device that generated the match signal.

Output match pins may be provided on every switching device 12 to output the match signals. Input match pins may be provided on every switching device 12 to input the match signals. For example, as shown in FIG. 1, the output match pins of the devices 12a and 12b are respectively connected to the input match pins of the devices 12b and 12c, and the output match pin of the switching device 12c is connected to the input match pin of the switching device 12a.

Alternatively, the match signal may be transferred via the expansion bus 26 as a prefix or suffix to the data frame. Such a prefix or suffix indicates that the DA information in the related data frame matches address information in one of the switching devices 12, and may uniquely identify the switching device 12 that generates the match signal.

Figure 2:
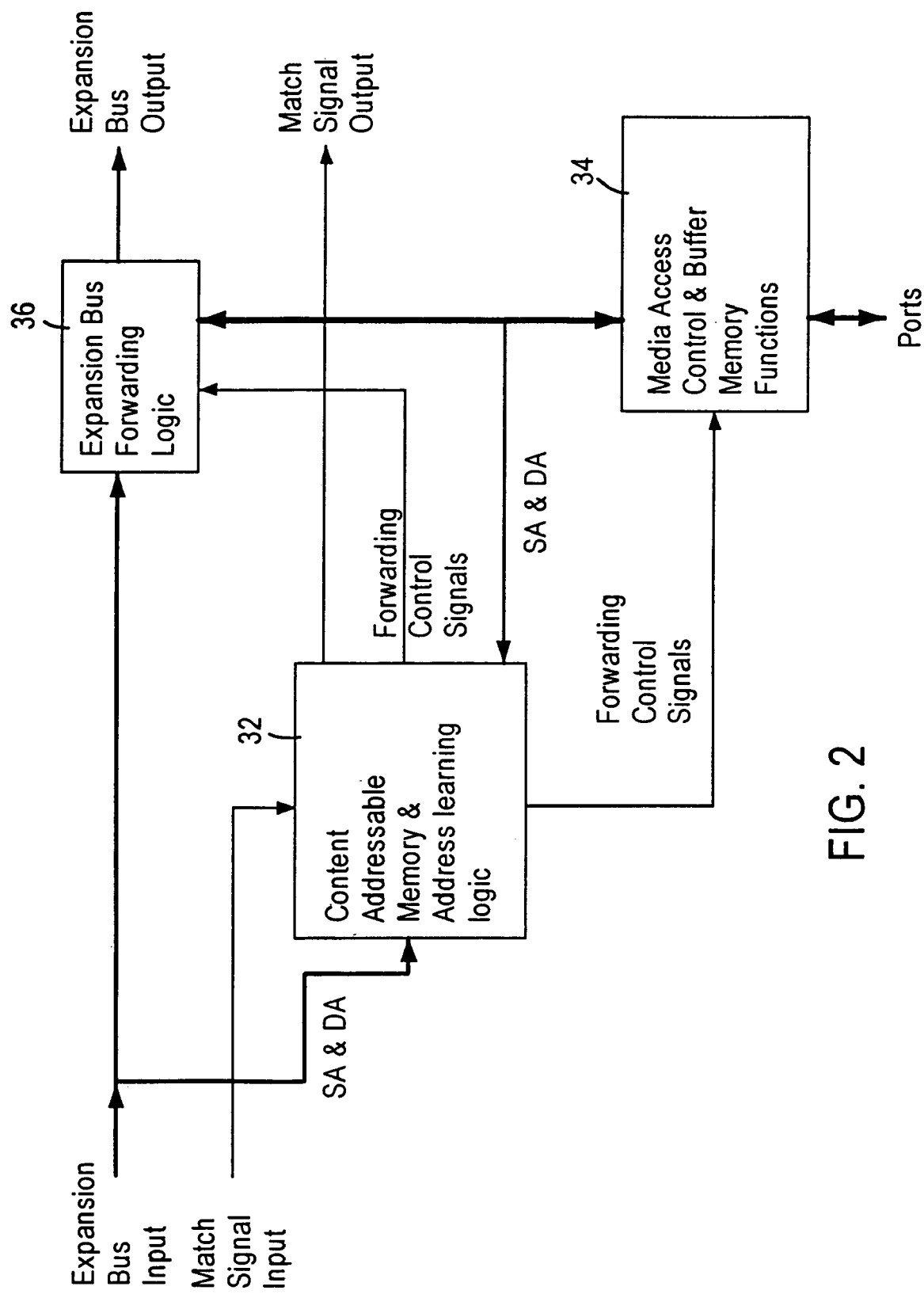
FIG. 2 is a simplified block diagram illustrating one of the multiple switching devices shown in FIG. 1.

FIG. 2 is a simplified diagram illustrating one of the three switching devices 12 shown in FIG. 1. The switching device 12 comprises a content addressable memory and address learning logic block 32 responsible for making decisions as to whether each frame received via either the expansion bus 26 or the media port should be forwarded, and if so, to which ports. Via an expansion bus input, the block 32 receives the SA information and DA information of frames received from the expansion bus 26. A media access control and buffer memory functions block 34 supplies the block 32 with the SA information and DA information of frames received from the network stations 14 connected to the corresponding switching device 12.

The block 32 comprises an address memory, and search logic for searching the address memory for SA and DA information retrieved from received frames. If the block 32 finds no match between the SA information of a received frame and the address information in its address memory, it adds a new address entry to the address memory to store the SA information and information on the port associated with the SA information.

The block 32 makes a frame forwarding decision by comparing the DA information of the received frame with the address information stored in the address memory. If the address information matching the DA information is found in the address memory, the block 32 produces a forwarding control signal to forward the received frame to the appropriate media port, or the expansion bus 26. In response to the forwarding control signal, an expansion bus forwarding logic 36 forwards the received frame to the expansion bus 26. The media access control block 34 is responsible for forwarding the frame to the appropriate media port in response to the forwarding control logic.

When the address information matching the DA information of the received frame is found in the address memory, the block 32 produces a match signal. Also, the block 32 generates a match signal when a frame forwarded via the expansion bus 26 is accompanied by a match signal asserted by another switching device 12 in the switching system.

Via the match signal output of the switching device 12, the match signal is supplied to the match signal input of the switching device connected to the match signal output. In response to the match signal, the block 32 of that switching device learns the DA information of the frame associated with the match signal. For example, a new entry may be added to the address table to store the received DA information and information on the port associated with the DA information. The switching device 12 uses the address information originated by the match signal to make forwarding decisions. As discussed above, the match signal may be transferred via separate input and output match pins or via the expansion bus 26.

Figure 3:
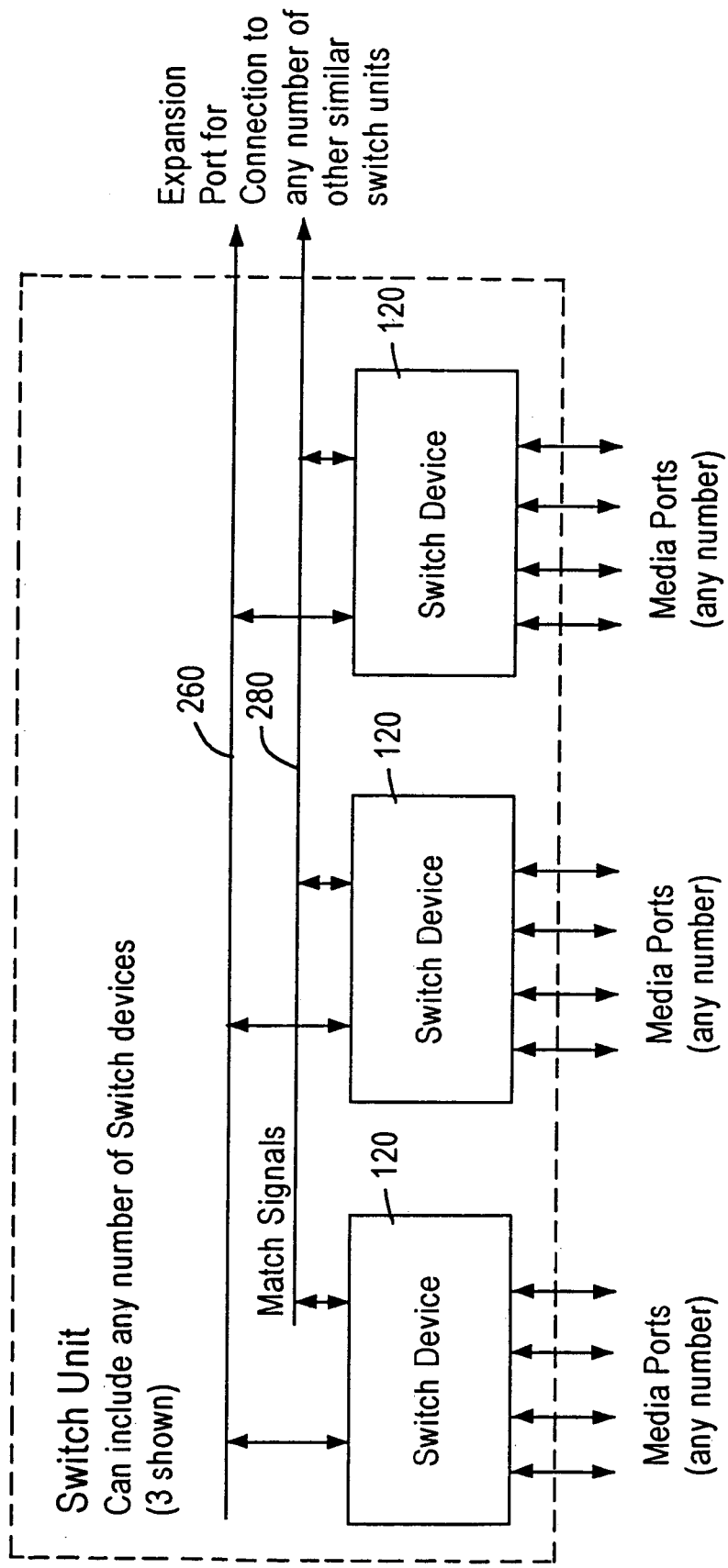
FIG. 3 is a block diagram illustrating another embodiment of the present invention.

Thus, the match signals are used to share address table information among multiple switching devices. This concept is applicable to many different types of expansion buses. For example, FIG. 3 shows another embodiment of the present invention, wherein the switch unit includes multiple switching devices 120 connected to a high bandwidth shared access expansion bus 260.

Each switching device 120 has multiple media ports that support data packet transmission and reception to and from multiple network stations. The match signals may be transferred via a separate match bus 280 or via the expansion bus 260. The expansion bus 260 and the match bus 280 may be connected to an expansion port configured for connection to any number of other similar switching units.

Thus, various types of expansion buses may be used in the switching system of the present invention. The physical implementation of the match signal depends on the characteristics of the expansion bus. If the expansion bus is a high-speed multi-master bus via which each frame is transmitted in whole, the match signal may be asserted at an early stage of the corresponding frame transfer. If the switching system uses a time division multiple access (TDMA) bus, the match signal may be asserted during the appropriate time slot.

Accordingly, the match signal accompanying a received frame enables the switching system to identify the switching device connected to the network node associated with the DA information of the received frame.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A data communication system comprising:
   multiple switching devices for switching data packets, and
   an expansion bus for transferring the data packets between the switching devices;
   each switching device having an address processing block for comparing destination address information of a received data packet with current address information, and producing a match signal supplied to another switching device when the destination address information matches the current information,
   wherein said data packet is not received from said another switching device, and
   the match signal informs said another switching device that the destination address information that causes the match signal is associated with the switching device that generates the match signal.

2. The system of claim 1, wherein the address processing block is configured for producing a forwarding control signal for forwarding the received data packet to a destination associated with the destination address information.

3. The system of claim 2, wherein the address processing block is configured for comparing source address information of the received data packet with the current address information to update the current address information in accordance with the source address information if the source address information does not match the current address information.

4. The system of claim 3, wherein the address processing block of said another switching device is responsive to the match signal for updating the current address information in accordance with the destination address information that causes the match signal.

5. The system of claim 4, wherein each switching device comprises a match pin connected to the match pin of said another switching device to transfer the match signal.

6. The system of claim 4, wherein the match signal is transferred via the expansion bus.

7. The system of claim 4, wherein the address processing block is configured for processing the source and destination address information of data packets received from the expansion bus.

8. The system of claim 4, wherein the address processing block of a switching device is further configured for processing the source and destination address information of data packets received from network stations connected to the switching device.

9. The system of claim 1, wherein said multiple switching devices are included into a switch unit of a packet switching network.

10. In a data switching system having multiple switching devices, a method of data switching comprising the steps of:
    comparing destination address information of a received data packet with first current address information maintained by a first switching device, and supplying a match signal to a second switching device when the destination address information matches the first current address information, wherein said data packet is not received from the second switching device, and the match signal informs the second switching device that the destination address information that causes the match signal is associated with the first switching device that generates the match signal.

11. The method of claim 10, wherein the second switching device stores second current information updateable in response to the match signal in accordance with the destination address information that causes the match signal.

12. The method of claim 11, further comprising the step of comparing source address information of the received data packet with the first current information to update the first current information in accordance with the source address information if the source address information does not match the first current information.

13. The method of claim 12, further comprising the step of comparing source address information of received data packets with the second current information to update the second current information in accordance with the source address information if the source address information does not match the second current information.

14. The method of claim 13, wherein the second switching device uses the second current information for making data packet forwarding decisions.

15. The method of claim 10, wherein said first and second switching devices are included into a switch unit of said data switching system.

* * * * *

UNITED STATES PATENT AND TRADEMARK OFFICE
CERTIFICATE OF CORRECTION

PATENT NO. : 6,963,562 B1  
APPLICATION NO. : 09/593815  
DATED : November 8, 2005  
INVENTOR(S) : Stephen McRobert It is certified that error appears in the above-identified patent and that said Letters Patent is hereby corrected as shown below:

IN THE CLAIMS:

Claim 8, Column 6, line 55, change "of claim 4" to -- of claim 7 --.

Signed and Sealed this

Eighth Day of May, 2007

JON W. DUDAS  
*Director of the United States Patent and Trademark Office*